May 28, 1940. H. BOERSCH 2,202,620

ELECTRON DEVICE

Filed Aug. 13, 1937

INVENTOR
HANS BOERSCH
BY
ATTORNEY

Patented May 28, 1940

2,202,620

UNITED STATES PATENT OFFICE 2,202,620

ELECTRON DEVICE

Hans Boersch, Berlin-Reinickendorf, Germany, assignor to Allgemeine Elektricitats Gesellschaft, Berlin, Germany, a corporation of Germany Application August 13, 1937, Serial No. 158,875
In Germany August 5, 1936

8 Claims. (Cl. 250—27.5)

This invention relates to electron devices and more particularly, to cathode ray tubes having magnetic lenses and provides an improved method of focusing together with improved magnetic lenses.

It is known that for the electron optical image production similar laws exist as those known from the theory of the optical image. In case of so-called individual lenses, i. e., lenses having on both sides the same constant potential (optically speaking: lenses which are surrounded on both sides by the same homogeneous medium) for the enlargement V, the optical formula $V=b/a$ is applicable. Herein, the quantity $b$ and $a$ are the respective distances of the image and the object both measured from the appertaining principal planes of the lense. Moreover, it is known that for thin magnetic lenses the principal planes almost come together, and pass through the point of gravity of the magnetic field strength H existing in the axis, or more exactly speaking, through the point of gravity of $H^2$. If there exists aside from the magnetic field, also an electrical field which may either be a pure acceleration field, or the field of a lens, it is necessary to consider, in the calculation of the point of gravity $H^2$, the electron velocity having different values at the various places of the axis, such as explained for instance for the case of calculating the focal distances in chapter III, 19 of "Geometrische Elektronenoptik," a book by Brueche & Scherzer (Berlin 1934).

In order to achieve large sized enlargements, as seen from the above formula for the enlargement, the lens is placed as near as possible to the object thus rendering the distance $a$ of the object as short as possible. However, it is not possible to place the electron lens as close to the object in an electron optical system as is possible in the case of optical systems. This is due to the fact that an electron-optical lens has a much greater spacial expanse than corresponding optical lenses.

Figure 1:
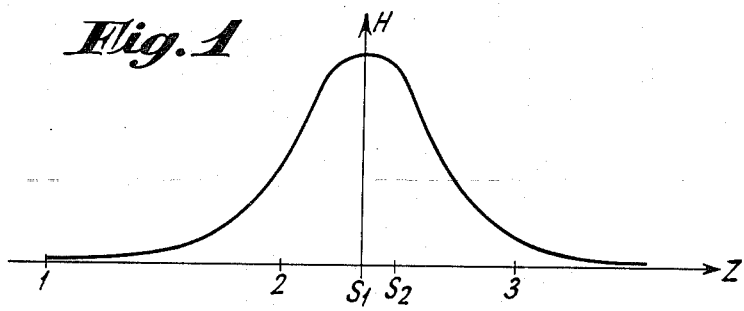
Figure 2:
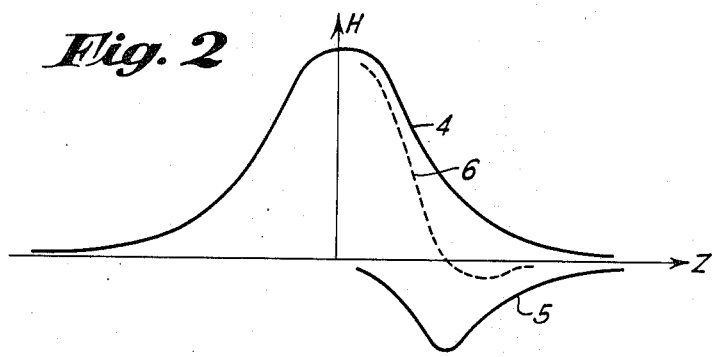
Figure 3:
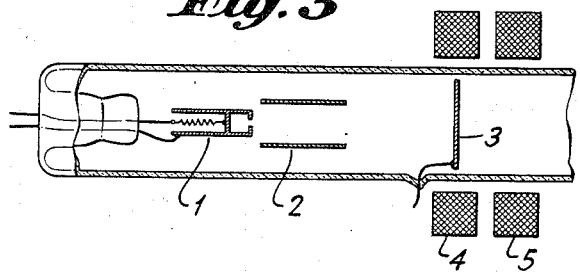
Figure 4:
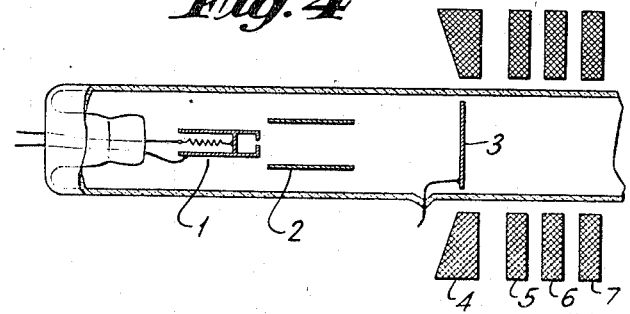

In explaining and describing the invention, reference will be made to the drawing, in which Figs. 1 and 2 show graphically the relationship between the strength of the magnetic field of the electron optical lens as a function of the distance between the object and the image;

Fig. 3 shows one embodiment of the invention in which two magnetic coils are utilized producing oppositely directed magnetic fields; while Fig. 4 shows a modification of the embodiment shown in Fig. 3 in which a plurality of magnetic coils are provided in which alternate coils produce oppositely directed magnetic fields.

An explanation for this is found in Figure 1 in which there is drawn for a definite magnetic lens the pattern of the field strength H above the axis of the lens designated herein by $z$. This curve furnishes immediately the curve for the value $H^2$ determining the lens action. The lens on which the measurement was based is a symmetrical lens so that in this case the point of gravity of H and also of $H^2$ will be in the geometrical center of the lens chosen in the figure as zero of the abscissa. Since for the following remarks the absolute values of $z$ and H are not pertinent, small units of measurement are indicated in the figure. Now, when placing the object in such distance from the lens as shown, for instance by the position designated by 1, it can be seen that almost the entire effective range of the lens still lies at the right of the object, so that the point of gravity of the lens lies in the zero point of the abscissa. The distance of the object designated by $a$ thus is given by the distance of the object from the geometrical center of the lens. Now, if the object is shifted substantially nearer to the lens such as for instance into the position 2 in order to achieve a decrease of the distance of the object, an essential part of the effective lens field will already be cut off, and the point of gravity of the lens field situated at the right of the object lies no longer in the zero point of the abscissa indicated by $S_1$ but will be displaced further towards the right, for instance to the point designated by $S_2$. In other words, the gain as regards distance decrease of the object aimed at by nearing the object to the center of the lens is again obviated in part due to the point of gravity of the lens being hereby displaced at the same time in the same direction.

Now, this displacement of the point of gravity of the lens could be diminished to a wide degree if the lens field would be limited more sharply, such that the slow descent of the effective field strength for instance at the right of the place designated by 3, would be broken off wherefore a rapid falling of the field to zero would be obtained, as it is clear that the wide range at the right of 3 despite the weaker field existing at this place, will contribute substantially to the lens action and hence, to the displacement of the point of gravity towards the right, especially if wide parts of the field are cut off at the left by the object. Furthermore the cutting off of the field at the left of the object has the disadvantage that when placing the object nearer to the lens also the totally effective lens field will be decreased so that in order to attain the same lens effect, the field strength would have to be increased.

Now, the invention provides means to overcome the said drawbacks and to provide a magnetic lens having a closely limited and well defined field range. In accordance with the invention the lens actually producing the image has a further lens with oppositely directed magnetic field placed in front thereof at the side facing away from the object such that a possibly steep falling of the resultant magnetic field down to zero is obtained. The action of such a lens will be briefly elucidated with reference to Figure 2. Herein, item 4 is likewise the curve represented in Figure 1. Item 5 represents the course of H for the additional lens, and the dotted curve 6 finally indicates the pattern of the resultant value H. It is seen that the desired, steeper falling of the H-curve and hence also of the $H^2$-curve is already obtained to a wide degree.

Eventually it may be of advantage in order to attain a still more favorable drop of the field strength curve to provide further auxiliary lenses, preferably connected in series whereby the direction of the magnetic field alternates. Finally, it is also possible in order to avoid the said decrease in the lens action at nearing of the object to the lens, to provide one or several auxiliary lenses not only at the side of the lens facing away from the object, but also at the side facing the object, said auxiliary lenses also producing a possibly steep field drop at the other side of the actual image lens.

For the sake of simplicity it was hitherto assumed that it is the question of a purely magnetic lens. Obviously corresponding measures can also be resorted to in case of a magnetic lens with superimposed electrical field. The same measures are also to be applied if the lens is a cylindrical lens as distinct from the ordinary axial symmetrical lenses.

In Figs. 3 and 4, 1 indicates the cathode of a discharge vessel, 2 indicates the plate. The foil 3 to be imaged is lighted by the electrodes with a homogeneous electron ray. Magnetic lens 4 serves for imaging the foil. In Fig. 3 the additional lens 5 has been placed before said magnetic lens 4, said lens 5 being passed by a smaller current in the opposite direction. In Fig. 4 several additional lenses are placed before the lens proper 4, lens 5 of said several lenses generating a field in the opposite direction, lenses 6 and 7 a field in the same direction as 4. The magnitude of the currents in the coils 5, 6 and 7 is so adjusted that the decline of the field to zero value occurs as steep as possible.

Having described my invention, what I claim is:

1. A cathode ray tube comprising an electron gun for producing a beam of electrons, a target electrode, means to bombard the target electrode by the produced beam of electrons, a first focusing electro-magnetic coil surrounding said target electrode, and a second focusing electro-magnetic coil positioned adjacent to and coaxial with said first coil and spaced from said first coil at a distance not greater than the dimension of said second coil measured along the axis of said beam of electrons for producing a field opposing the field of said first coil, whereby asymmetry of the field of the first coil about a midpoint of said first coil in planes in which the axis of the beam of electrons lies is produced.

2. In a cathode ray device, the method of focusing a beam of electrons which comprises the steps of positioning a magnetic field symmetrical both about and along the axis of said beam, and positioning a second magnetic field coinciding with a portion of the first named magnetic field to produce a composite magnetic field symmetrical about said axis in planes perpendicular to said axis and asymmetrical about the midpoint of the first named magnetic field in planes in which the beam axis lies.

3. In a cathode ray device, the method of focusing a beam of electrons which comprises the steps of positioning a symmetrical magnetic field about the axis of said beam, said field having a predetermined direction, positioning a second magnetic field in juxtaposition with the first magnetic field and having its direction opposite to the said predetermined direction of the first magnetic field, and positioning the produced second magnetic field so that the combined first named magnetic field and second named magnetic field are symmetrical about said axis and asymmetrical about a midpoint of said first named field in planes in which said axis lies.

4. A cathode ray tube comprising means for producing a beam of electrons, magnetic coils surrounding the beam of electrons to produce a magnetic field whose lines of force coincide with the beam of electrons, said lines of force having a predetermined polarity, and means to produce a second magnetic field adjacent to and superimposed upon a portion of the first named magnetic field and with a polarity opposite to the polarity of the first named field, said second magnetic field having a magnitude different from that of said first named magnetic field and positioned to maintain symmetry about the beam of electrons, and to produce asymmetry about the midpoint of the first named magnetic field in planes in which the axis of said beam lies.

5. A cathode ray tube device comprising means for producing a beam of electrons, a symmetrical electro-magnetic electron lens for focusing the beam of electrons, and a second symmetrical electro-magnetic electron lens for modifying the symmetry of the first named lens about the midpoint of the first named lens in planes in which the axis of the beam of electrons lies.

6. A cathode ray tube device comprising an electron gun for producing a beam of electrons, a target electrode, means to bombard the target electrode by the produced beam of electrons, and means adjacent the target electrode for producing a magnetic field symmetrical in planes perpendicular to the axis of said beam and asymmetrical about the midpoint of said field in planes in which said axis lies, said target electrode being normal to the axis.

7. A cathode ray tube comprising an electron gun for producing a beam of electrons, a target electrode, means to bombard the target electrode by the produced beam of electrons, means adjacent the target electrode for producing a magnetic field symmetrical about and along the axis of said beam, and means for producing a second magnetic field coinciding with a portion of the first named magnetic field to produce a composite magnetic field symmetrical about the said axis and asymmetrical about the midpoint of the first named field in which said axis lies, said target being normal to said axis.

8. A cathode ray tube comprising an electron gun for producing a beam of electrons, a target electrode, means to bombard the target electrode by the produced beam of electrons, means adjacent the target electrode for producing a symmetrical magnetic field about the axis of said beam, said magnetic field having a predetermined direction, means for producing a second magnetic field in juxtaposition with the first magnetic field and having its direction opposite to the said predetermined direction of the first magnetic field, said second magnetic field being positioned so that the combined named fields give a resultant magnetic field symmetrical about said axis and asymmetrical about the midpoint of the first named magnetic field in planes in which said axis lies.

HANS BOERSCH.